United States Patent
Tseng

(10) Patent No.: US 8,550,634 B2
(45) Date of Patent: Oct. 8, 2013

(54) LIGHT SOURCE MODULE, PROJECTION APPARATUS, AND METHOD OF CONTROLLING THE SAME

(75) Inventor: Chih-Neng Tseng, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 322 days.

(21) Appl. No.: 13/046,696

(22) Filed: Mar. 12, 2011

(65) Prior Publication Data

US 2012/0019785 A1  Jan. 26, 2012

(30) Foreign Application Priority Data

Jul. 26, 2010  (CN) .......................... 2010 1 0239888

(51) Int. Cl.
  *G03B 21/14* (2006.01)
  *G03B 21/20* (2006.01)
  *G03B 21/26* (2006.01)
  *F21V 9/16* (2006.01)
  *H04N 9/12* (2006.01)

(52) U.S. Cl.
  USPC ............... 353/84; 353/85; 353/94; 362/84; 348/743

(58) Field of Classification Search
  USPC .............. 353/84, 85, 94, 122, 30, 31; 359/885–892; 313/483, 501; 362/84, 362/231; 250/484.2, 484.4, 493.1–504 H; 348/743
  See application file for complete search history.

(56) References Cited

U.S. PATENT DOCUMENTS

| | | | |
|---|---|---|---|
| 2006/0215122 A1* | 9/2006 | Hong | 353/31 |
| 2009/0284148 A1 | 11/2009 | Iwanaga | |
| 2010/0097779 A1 | 4/2010 | Gladnick et al. | |
| 2010/0245777 A1* | 9/2010 | Ogura | 353/38 |
| 2010/0328625 A1* | 12/2010 | Miyazaki et al. | 353/85 |

FOREIGN PATENT DOCUMENTS

| | | |
|---|---|---|
| CN | 102053467 | 5/2011 |
| CN | 102053468 | 5/2011 |
| CN | 102081292 | 6/2011 |
| CN | 102207669 | 10/2011 |

OTHER PUBLICATIONS

"First Office Action of China counterpart application" with English translation thereof, issued on Jan. 25, 2013, p. 1-p. 14.

* cited by examiner

*Primary Examiner* — William C Dowling
*Assistant Examiner* — Ryan Howard
(74) *Attorney, Agent, or Firm* — Jianq Chyun IP Office

(57) ABSTRACT

A light source module, a projection apparatus, and a method of controlling the projection apparatus are provided. The projection apparatus has the light source module. The light source module has a first light source, a wavelength transforming unit, and a driver. The first light source generates a first light beam having a first wavelength according to a first pulse width modulation (PWM) signal. The wavelength transforming unit transforms the first light beam into a second light beam having a second wavelength. The driver drives the wavelength transforming unit, such that the first light beam irradiates a start position on the wavelength transforming unit when a rising edge of the first PWM signal is detected. The start position is determined by a controller.

22 Claims, 11 Drawing Sheets

LIGHT SOURCE MODULE, PROJECTION APPARATUS, AND METHOD OF CONTROLLING THE SAME

CROSS-REFERENCE TO RELATED APPLICATION

This application claims the priority benefit of China application serial no. 201010239888.6, filed Jul. 26, 2010. The entirety of the above-mentioned patent application is hereby incorporated by reference herein and made a part of this specification.

BACKGROUND OF THE INVENTION

1. Field of the Invention

The invention relates to a light source module, a projection apparatus, and a method of controlling the projection apparatus. More particularly, the invention relates to a light source module having a wavelength transforming unit, a projection apparatus, and a method of controlling the projection apparatus.

2. Description of Related Art

A projection apparatus can project images onto a large screen, so as to assist people to watch the images displayed on the screen. Therefore, the projection apparatus is generally applied in public places, such as companies, schools, and so on. Besides, as family-used display products tend to be large-scaled, the projection apparatus is also prevailing in general families and becomes a commonly used electronic product in people's daily lives.

With development of science and technology, various electronic products are developed toward the trend of high speed, favorable performance, and compactness. As such, projectors having light emitting diodes (LED) as the light source are progressing. Nonetheless, the limited light emitting efficiency of the LED restricts luminance of images projected by the projector having the solid LED as the light source. In order to overcome the development barrier of the LED projectors, hybrid light sources have been deemed suitable for new projectors. For instance, as disclosed in US publication no. 2010/0097779, a light source apparatus has a light source that generates a light beam irradiating fluorescent powder to obtain required color light. Since the light beam irradiates the fluorescent powder along a spiral path, life time of the fluorescent powder can be extended. Moreover, in US publication no. 2009/0284148, a light source of a projector is disclosed, wherein a rotating transparent base material is coated with a variety of fluorescent powder. Since excitation light generated by the light source irradiates various fluorescent powders, different color light are obtained in turn.

SUMMARY OF THE INVENTION

The invention is directed to a light source module having a first light source. Based on a pulse width modulation (PWM) signal, a light beam generated by the first light source periodically irradiates a wavelength transforming unit, so as to generate color light different from the incident light beam. Here, the light beam irradiates a start position on the wavelength transforming unit, and the start position can be changed based on the actual condition of use, so as to extend the life time of the wavelength transforming unit.

The invention is further directed to a projection apparatus irradiating a wavelength transforming unit with a light beam based on a PWM signal, so as to periodically generate required color light. By means of the wavelength transforming unit, the light source with low light emitting efficiency can be replaced by a light source with high light emitting efficiency.

The invention is further directed to a method of controlling a projection apparatus. In the method, a wavelength transforming unit is irradiated by a light beam based on a PWM signal, so as to periodically generate required color light.

Other objects and advantages of the invention can be further comprehended by the technical features broadly embodied and described as follows.

An embodiment of the invention provides a light source module. The light source module includes a first light source, a wavelength transforming unit, and a driver. The first light source generates a first light beam having a first wavelength according to a first PWM signal. The wavelength transforming unit transforms the first light beam into a second light beam having a second wavelength. The driver drives the wavelength transforming unit, such that the first light beam irradiates a start position when a rising edge of the first PWM signal is detected. The start position is determined by a controller.

An embodiment of the invention provides a projection apparatus. The projection apparatus includes a lens, a timing device, a controller, and a light source module. The lens projects images. The timing device accumulates an using time of the projection apparatus. The controller determines a start position based on the using time of the projection apparatus. The light source module includes a first light source, a wavelength transforming unit, and a driver. The first light source generates a first light beam having a first wavelength according to a first PWM signal. The wavelength transforming unit transforms the first light beam into a second light beam having a second wavelength. The driver drives the wavelength transforming unit to move, and the first light beam irradiates the start position on the wavelength transforming unit when a rising edge of the first PWM signal is detected.

An embodiment of the invention provides a method of controlling a projection apparatus. The method includes: providing a timing device to accumulate an using time of the projection apparatus; determining a start position on a wavelength transforming unit of the projection apparatus based on the using time of the projection apparatus; driving a first light source to generate a first light beam having a first wavelength based on a first PWM signal; driving the wavelength transforming unit, such that the first light beam irradiates the start position on the wavelength transforming unit when a rising edge of the first PWM signal is detected. The wavelength transforming unit transforms the first light beam into a second light beam having a second wavelength.

According to an embodiment of the invention, when the using time of the projection apparatus reaches a multiple of a predetermined time period, the controller changes the start position on the wavelength transforming unit.

According to an embodiment of the invention, the driver has a motor for rotating the wavelength transforming unit. When the wavelength transforming unit rotates and the first PWM signal is at a high voltage level, the first light beam irradiates an arc-shaped section of the wavelength transforming unit from the start position.

According to an embodiment of the invention, the wavelength transforming unit has a substrate. The substrate is coated with fluorescent powder. When the fluorescent powder is irradiated by the first light beam, the second light beam having the second wavelength is generated.

According to an embodiment of the invention, the substrate is made up of a light-transmissive material, and the first light beam and the second light beam can respectively enter into and emit from the substrate in the same direction.

According to an embodiment of the invention, the substrate is made up of a non-light-transmissive material, e.g., a reflective mirror, such that the first and the second light beams are respectively reflected by the substrate.

According to an embodiment of the invention, the first light source has at least one LED or at least one laser diode.

According to an embodiment of the invention, the light source module further includes a second light source and a third light source. The second light source generates a third light beam having a third wavelength based on a second PWM signal. The third light source generates a fourth light beam having a fourth wavelength based on a third PWM signal.

According to an embodiment of the invention, the first, the second, and the third PWM signals are not overlapped with one another when these PWM signals are at the high voltage level.

According to an embodiment of the invention, the first and the third PWM signals are partially overlapped when the first and the third PWM signals are at the high voltage level.

In the previous embodiments of the invention, the first light source emits the light beam to the wavelength transforming unit periodically based on the PWM signal, so as to obtain color light different from the incident light beam. Here, the light beam irradiates a start position on the wavelength transforming unit, and the start position can be changed based on the actual condition of use, so as to extend the life time of the wavelength transforming unit. On the other hand, the wavelength transforming unit can transform the first light beam having the first wavelength into the second light beam having the second wavelength. Therefore, the light source with low light emitting efficiency can be replaced by the light source with high light emitting efficiency, and energy can be better utilized.

Other objectives, features and advantages of the invention will be further understood from the further technological features disclosed by the embodiments of the invention wherein there are shown and described preferred embodiments of this invention, simply by way of illustration of modes best suited to carry out the invention.

DESCRIPTIONS OF EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
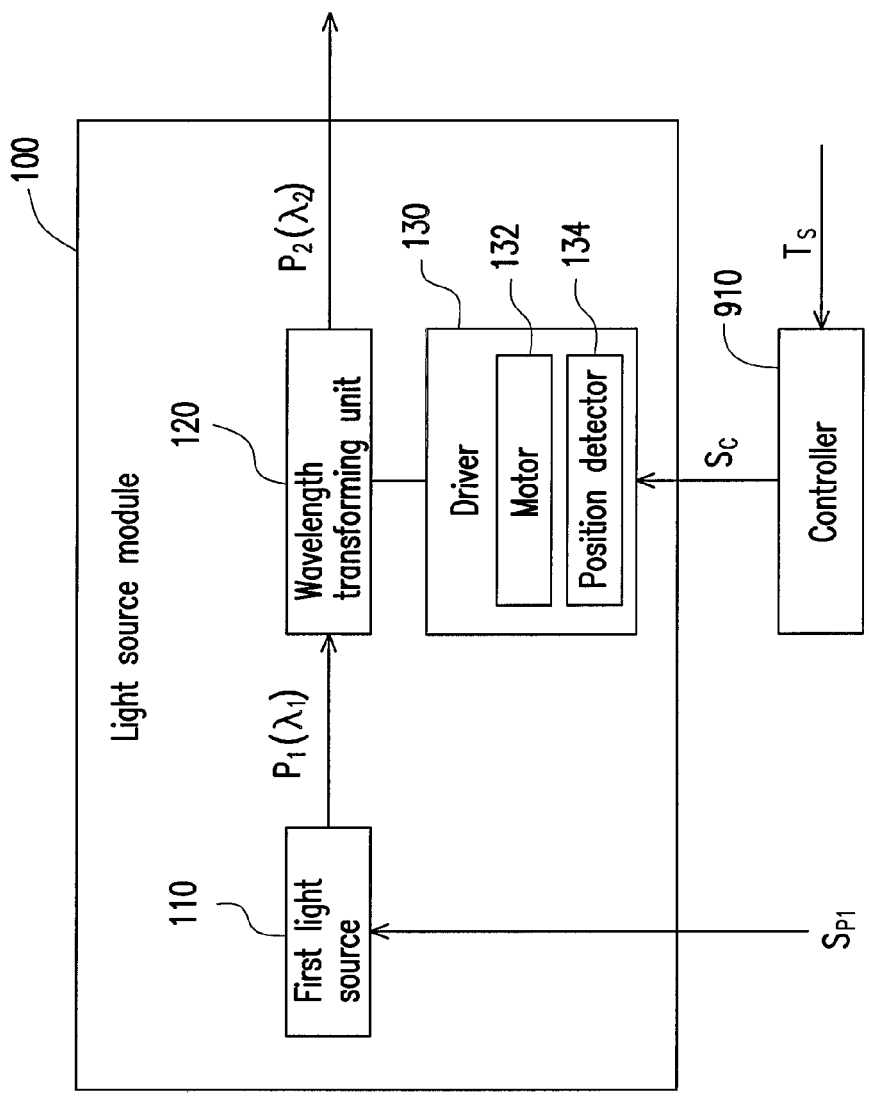
FIG. 1 is a block view illustrating functions of a light source module according to an embodiment of the invention.

FIG. 1 is a block view illustrating functions of a light source module 100 according to an embodiment of the invention. The light source module 100 has a first light source 110, a wavelength transforming unit 120, and a driver 130. The first light source 110 generates a first light beam $P_1$ having a first wavelength $\lambda_1$ according to a first PWM signal $S_{P_1}$. The wavelength transforming unit 120 transforms the first light beam $P_1$ into a second light beam $P_2$ having a second wavelength $\lambda_2$. The driver 130 drives the wavelength transforming unit 120.

Figure 2:
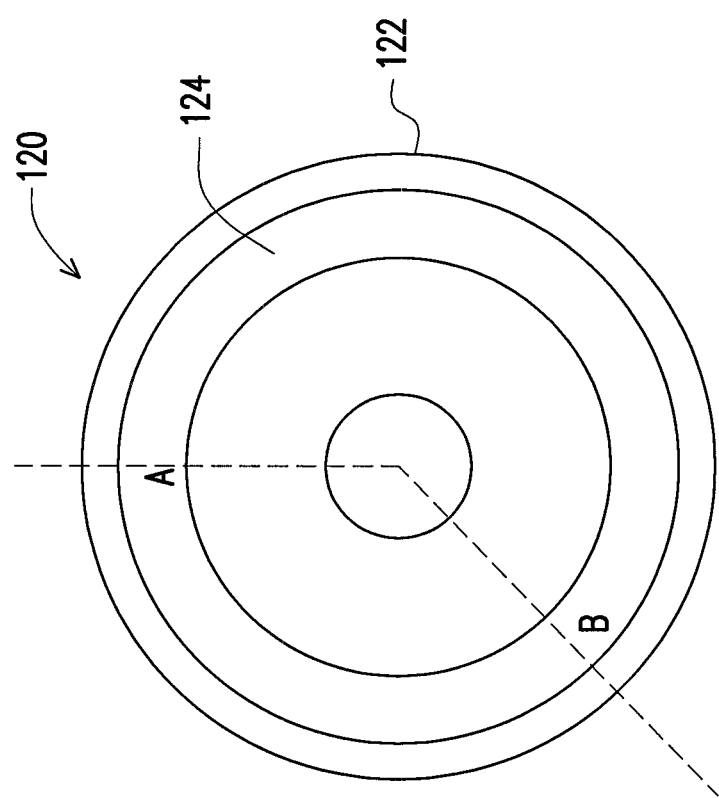
FIG. 2 is a top view illustrating a wavelength transforming unit depicted in FIG. 1.
Figure 3:
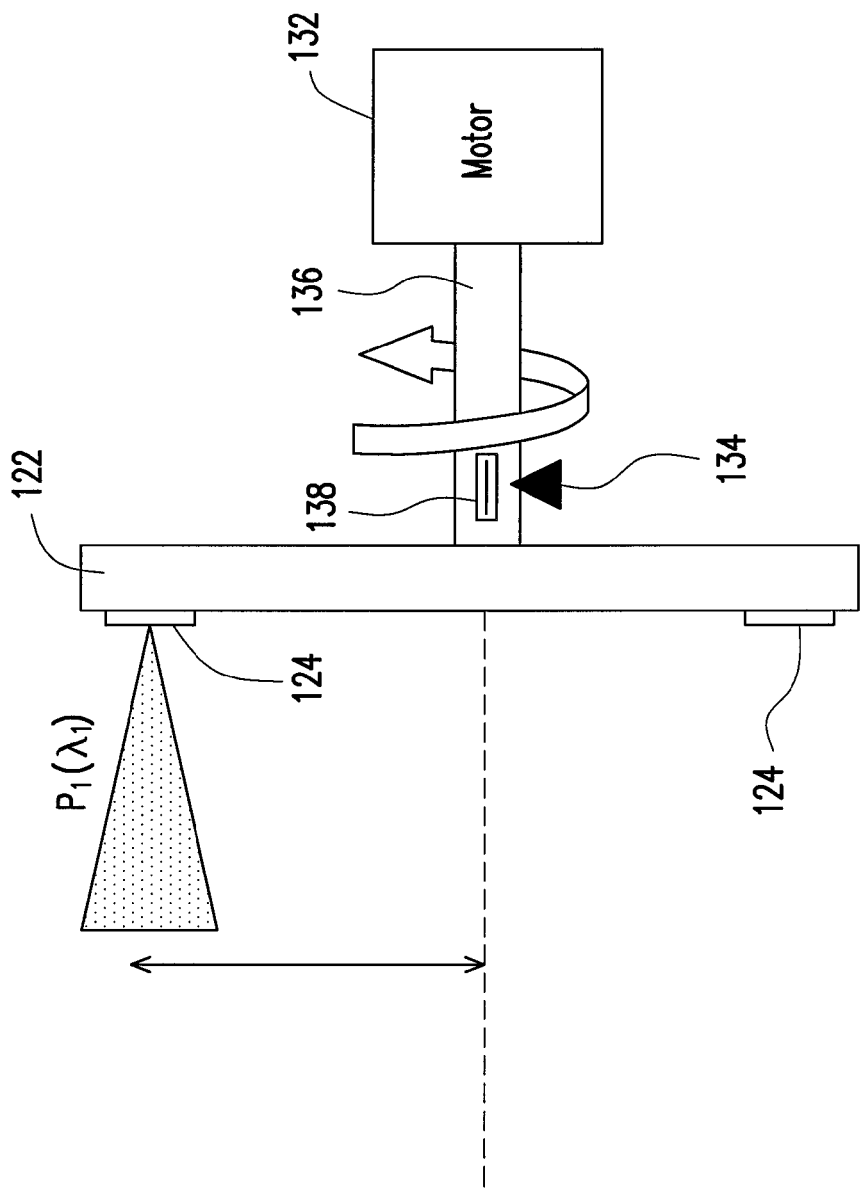
FIG. 3 is a side view illustrating the wavelength transforming unit and a driver depicted in FIG. 1.
Figure 4:
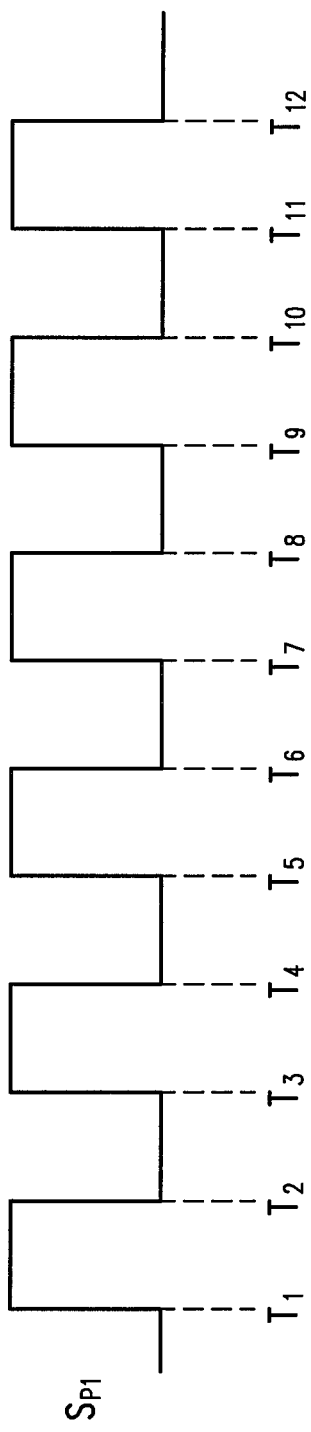
FIG. 4 is a timing diagram illustrating a first PWM signal depicted in FIG. 1.
Figure 5:
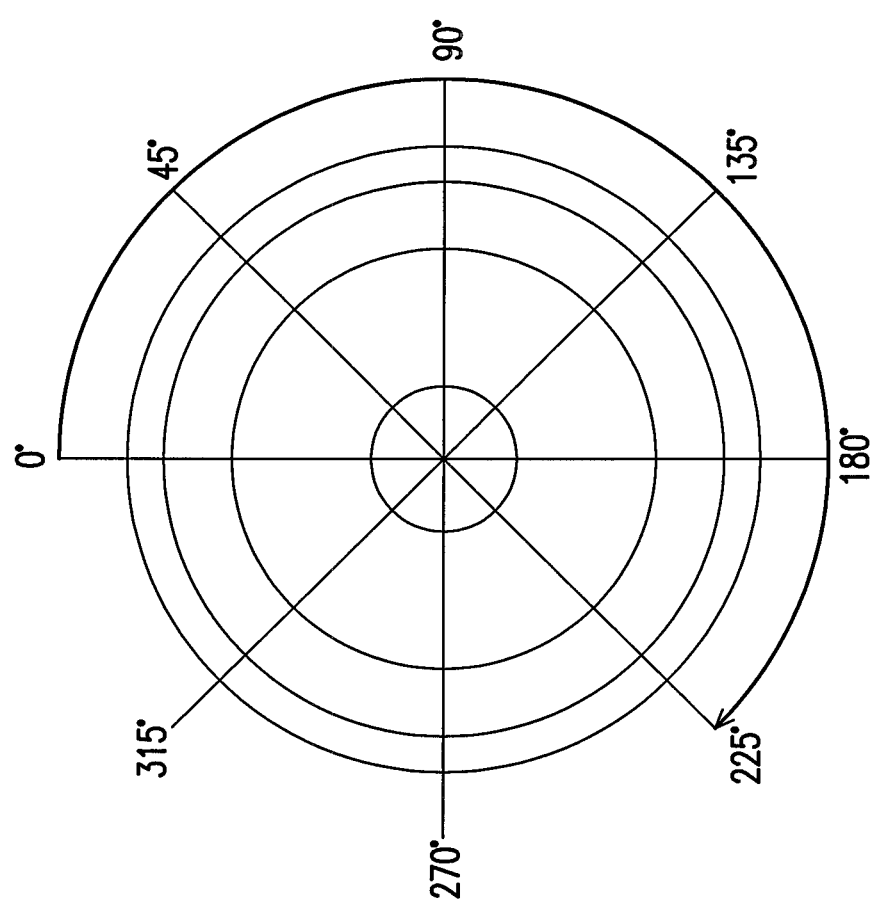
FIG. 5 to FIG. 8 illustrate a method of controlling a wavelength transforming unit according to an embodiment of the invention.
Figure 6:
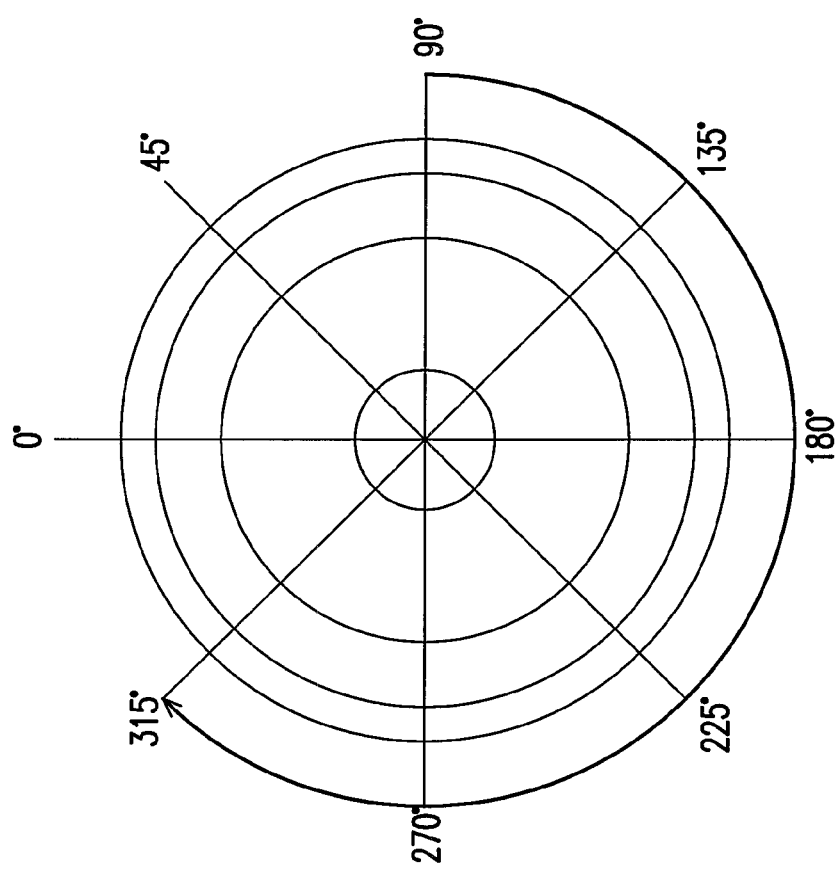
Figure 7:
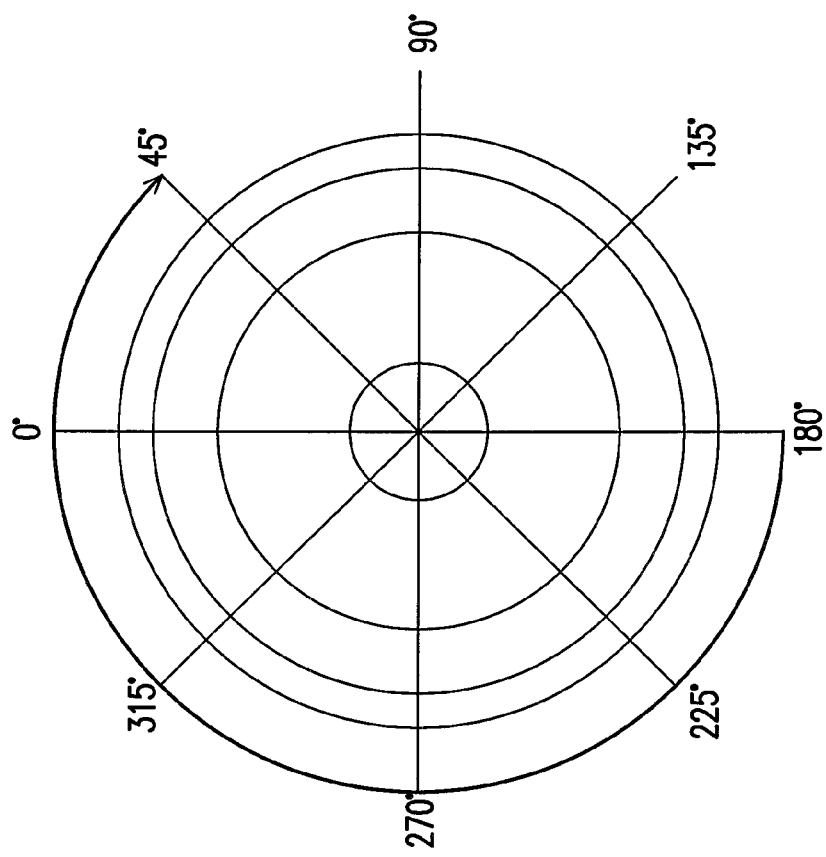
Figure 8:
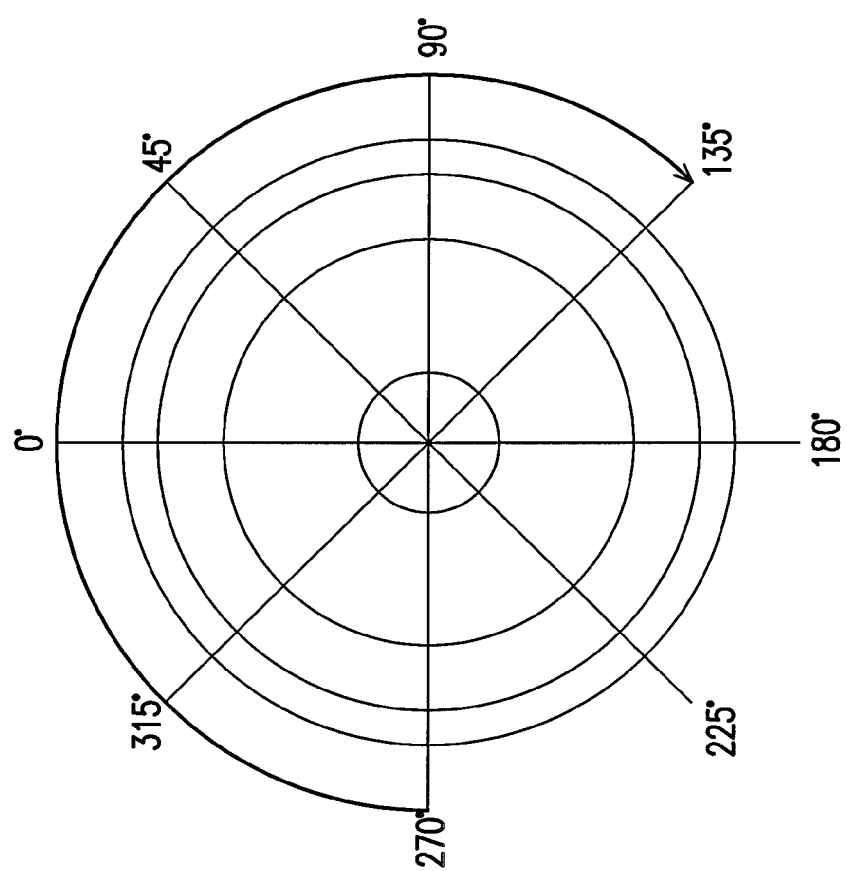

Please refer to FIG. 1 to FIG. 4. FIG. 2 is a top view illustrating the wavelength transforming unit 120 depicted in FIG. 1. FIG. 3 is a side view illustrating the wavelength transforming unit 120 and the driver 130 depicted in FIG. 1. FIG. 4 is a timing diagram illustrating a first PWM signal $S_{P_1}$ depicted in FIG. 1. The wavelength transforming unit 120 has a substrate 122. According to this embodiment, the substrate 122 is circular and connected to a rotating shaft 136 of the driver 130. The substrate 122 is coated with a florescent layer 124. When the fluorescent layer 124 is irradiated by the first light beam $P_1$, the second light beam $P_2$ having the second wavelength $\lambda_2$ is generated. The driver 130 has a motor 132 and a position detector 134. The motor 132 rotates the wavelength transforming unit 120 by means of the rotation shaft 136. A positioning label 138 is placed on the rotation shaft 136. By detecting the positioning label 138, the position detector 134 may determine the rotation angle at which the wavelength transforming unit 120 rotates. As such, the first light beam $P_1$ can be controlled to irradiate a specific position on the wavelength transforming unit 120. According to an embodiment of the invention, a start position A on the wavelength transforming unit 120 is determined by a controller 910, and a control signal $S_C$ is transmitted to the driver 130. When a rising edge of the first PWM signal $S_{P1}$ is detected, the first light beam $P_1$ irradiates the start position A on the wavelength transforming unit 120, as indicated in FIG. 2. In other words, under the control of the controller 910, the driver 130 drives the wavelength transforming unit 120 to rotate, and the start position A on the wavelength transforming unit 120 is irradiated by the first light beam $P_1$ at the timing $T_1$, $T_3$, $T_5$, $T_7$, $T_9$, and $T_{11}$. As disclosed above, the first light source 110 generates the first light beam $P_1$ having the first wavelength $\lambda_1$ according to the first PWM signal $S_{P1}$. Specifically, when the first PWM signal $S_{P1}$ is at the high voltage level, the first light source 110 generates the first light beam $P_1$ having the first wavelength $\lambda_1$. When the first PWM signal $S_{P1}$ is at the low voltage level, the first light source 110 temporarily ceases to generate the first light beam $P_1$ having the first wavelength $\lambda_1$. In other words, as exemplarily shown in FIG. 4, the first light beam $P_1$ is generated at the time periods $T_1 \sim T_2$, $T_3 \sim T_4$, $T_5 \sim T_6$, $T_7 \sim T_8$, $T_9 \sim T_{10}$, and $T_{11} \sim T_{12}$. In addition, when the motor 132 drives the wavelength transforming unit 120 to rotate and the first PWM signal $S_{P1}$ is at the high voltage level, the first light beam $P_1$ irradiates an arc-shaped section of the wavelength transforming unit 120 from the start position A. As exemplarily shown in FIG. 2, the arc-shaped section starts at the start position A and ends at an ending position B. The ending position B corresponds to a falling edge of the first PWM signal $S_{P1}$ and corresponds to the timing $T_2$, $T_4$, $T_6$, $T_8$, $T_{10}$, and $T_{12}$.

With reference to FIG. 1 and FIG. 3, in an embodiment of the invention, the substrate 122 is made up of a light-transmissive material, and the first light beam $P_1$ and the second light beam $P_2$ respectively enter into and emit from the substrate 122 in the same direction. Besides, in an embodiment of the invention, the substrate 122 is made up of a non-light-transmissive material, e.g., a reflective apparatus, such that the first light beam $P_1$ and the second light beam $P_2$ are respectively reflected by the substrate 122. Here, the reflective apparatus may be coated onto the substrate 122.

In an embodiment of the invention, the first light source 110 can be a blue laser diode or a blue LED. The first light beam $P_1$ generated by the first light source 110 is blue. The fluorescent layer 124 is fluorescent powder capable of generating green light, and the fluorescent layer 124 can transform the first light beam $P_1$ having the blue wavelength into the second light beam $P_2$ having the green wavelength. The green LED having low light emitting efficiency can be replaced by the blue LED together with the fluorescent powder capable of generating the green light.

In addition, the wavelength transforming unit 120 rotates, and a duty cycle of the first PWM signal $S_{P1}$ is not equal to 100%. Hence, when the light source module 100 is on, the fluorescent layer 124 on the wavelength transforming unit 120 is not constantly irradiated by the first light beam $P_1$. As such, the life time of the fluorescent layer 124 is not rapidly decreased, and the life time of the light source module 100 can be further extended.

According to an embodiment of the invention, the controller 910 determines the start position A on the wavelength transforming unit 120 based on the using time Ts of the projection apparatus. The using time Ts can be the accumulated time that starts after the light source module 100 is powered on. Alternatively, the using time Ts can be the total operation time of the first light source 110. The controller 910 changes the start position A based on the using time Ts, and a section of the fluorescent layer 124 irradiated by the first light beam $P_1$ is adjusted because of the using time Ts. Thereby, the life time of the fluorescent layer 124 can be further increased.

Please refer to FIG. 5 to FIG. 8. FIG. 5 to FIG. 8 illustrate a method of controlling the wavelength transforming unit 120 according to an embodiment of the invention. As shown in the drawings, different using time Ts leads to different sections of the wavelength transforming unit 120 irradiated by the first light beam $P_1$ according to this embodiment. For instance, the wavelength transforming unit 120 rotates along a clockwise direction. When the using time Ts ranges from 0 hour to 500 hours, the 0°~225° section of the wavelength transforming unit 120 is irradiated by the first light beam $P_1$. When the using time Ts ranges from 500 hours to 1000 hours, the 90°~315° section of the wavelength transforming unit 120 is irradiated by the first light beam $P_1$. When the using time Ts ranges from 1000 hours to 1500 hours, the 180°~45° section of the wavelength transforming unit 120 is irradiated by the first light beam $P_1$. When the using time Ts ranges from 1500 hours to 2000 hours, the 270°~135° section of the wavelength transforming unit 120 is irradiated by the first light beam $P_1$. Namely, when the using time Ts reaches 500 hours, the start position A is rotated by 90° along the clockwise direction. That is to say, when the using time Ts is accumulated and reaches a multiple of a predetermined time period, the controller 910 changes the start position A on the wavelength transforming unit 120. In this embodiment, the predetermined time period is 500 hours, for instance. In view of different optical design requirements, the configuration of the irradiated section, the predetermined time period, and the rotation angle can all be adjusted.

Figure 9:
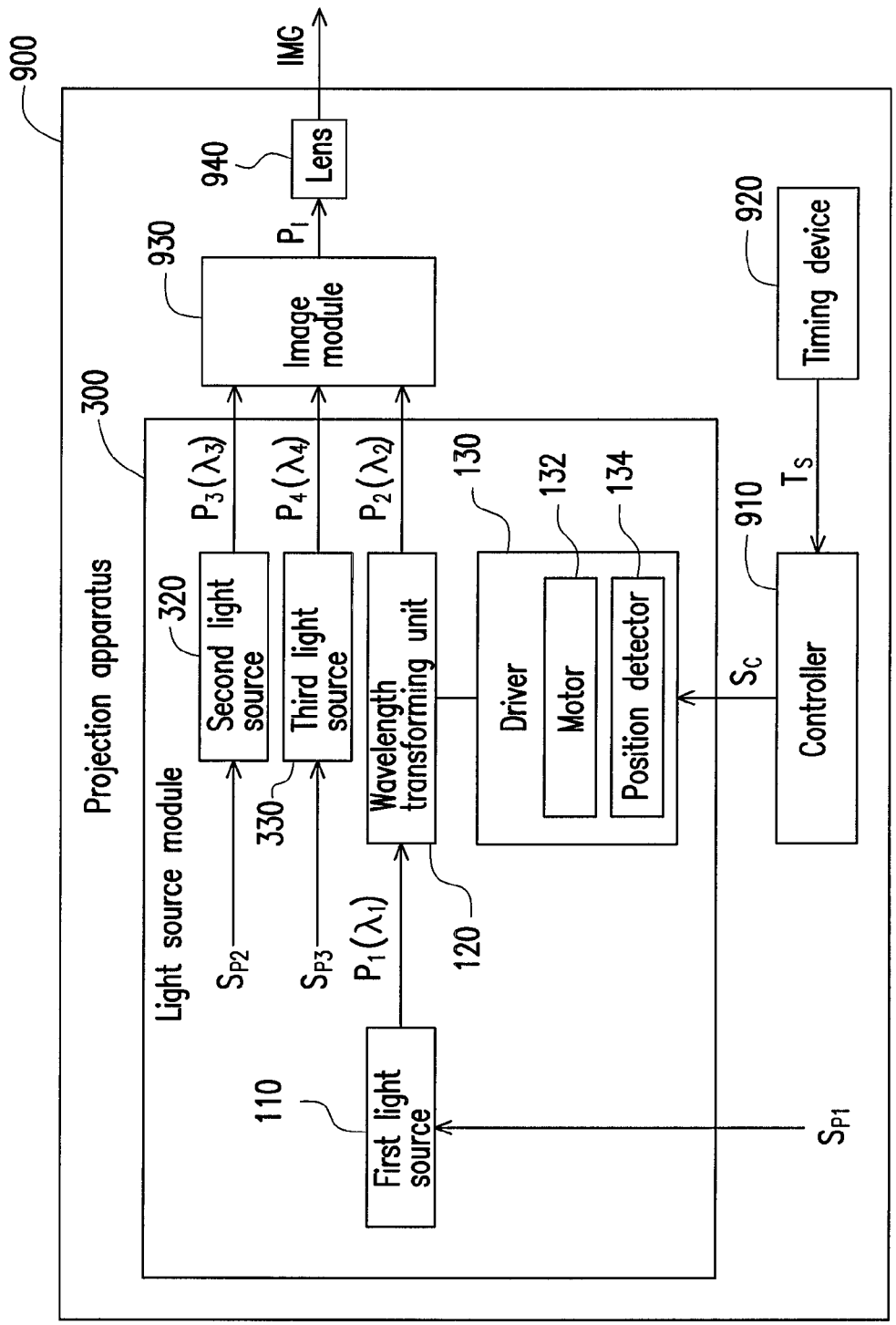
FIG. 9 is a block view illustrating functions of a projection apparatus according to an embodiment of the invention.

In an embodiment of the invention, the light source module is applicable to the projection apparatus. FIG. 9 is a block view illustrating functions of a projection apparatus 900 according to an embodiment of the invention. The projection apparatus 900 has a light source module 300. The difference between the light source module 300 and the light source module 100 lies in that the light source module 300 further has a second light source 320 and a third light source 330. The second light source 320 generates a third light beam $P_3$ having a third wavelength $\lambda_3$ based on a second PWM signal $S_{P2}$. The third light source 330 generates a fourth light beam $P_4$ having a fourth wavelength $\lambda_4$ based on a third PWM signal $S_{P3}$. In an embodiment of the invention, the first light source 110 can be the blue LED or the blue laser diode, the second light source 320 can be another blue LED, and the third light source 330 can be the red LED. Here, the first light beam $P_1$ and the third light beam $P_3$ are blue light beams, the second light beam $P_2$ is a green light beam, and the fourth light beam $P_4$ is a red light beam. The first wavelength $\lambda_1$ can be similar to the third wavelength $\lambda_3$, while the fourth wavelength $\lambda_4$ is different from the first and the third wavelengths $\lambda_1$ and $\lambda_3$. The second light beam $P_2$, the third light beam $P_3$, and the fourth light beam $P_4$ irradiate an image module 930 of the projection apparatus 900, such that the image module 930 generates an image light beam $P_I$. The image light beam $P_I$ projects an image IMG through a lens 940 of the projection apparatus 900. Besides, the projection apparatus 900 has a controller 910 and a timing device 920. The controller 910 determines the start position A on the wavelength transforming unit 120 based on the using time $T_S$. The timing device 920 accumulates the using time $T_S$ of the projection apparatus 900. Additionally, in an embodiment of the invention, the first PWM signal $S_{P1}$, the second PWM signal $S_{P2}$, and the third PWM signal $S_{P3}$ are generated by the controller 910 for controlling the operation of the first light source 110, the second light source 320, and the third light source 330.

Figure 10:
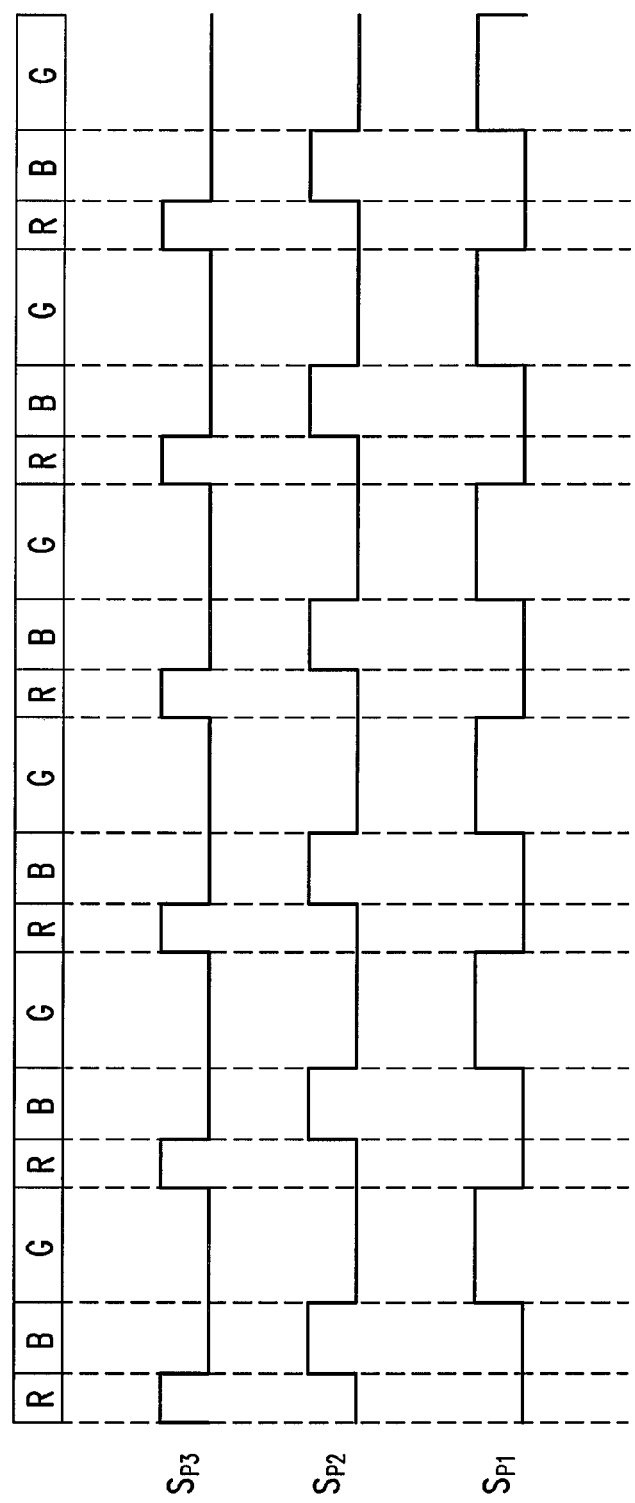
FIG. 10 is a timing diagram illustrating a first PWM signal, a second PWM signal, and a third PWM signal depicted in FIG. 9.

Please refer to FIG. 10. FIG. 10 is a timing diagram illustrating a first PWM signal $S_{P1}$, a second PWM signal $S_{P2}$, and a third PWM signal $S_{P3}$ depicted in FIG. 9. In FIG. 10, the first, the second, and the third PWM signals $S_{P1}$, $S_{P2}$, and $S_{P3}$ of this embodiment are not overlapped with one another when these PWM signals $S_{P1}$, $S_{P2}$, and $S_{P3}$ are at the high voltage level. Hence, the fourth light beam (the red (R) light beam) $P_4$, the third light beam (the blue (B) light beam) $P_3$, and the second light beam (the green (G) light beam) $P_2$ are sequentially and periodically generated.

Figure 11:
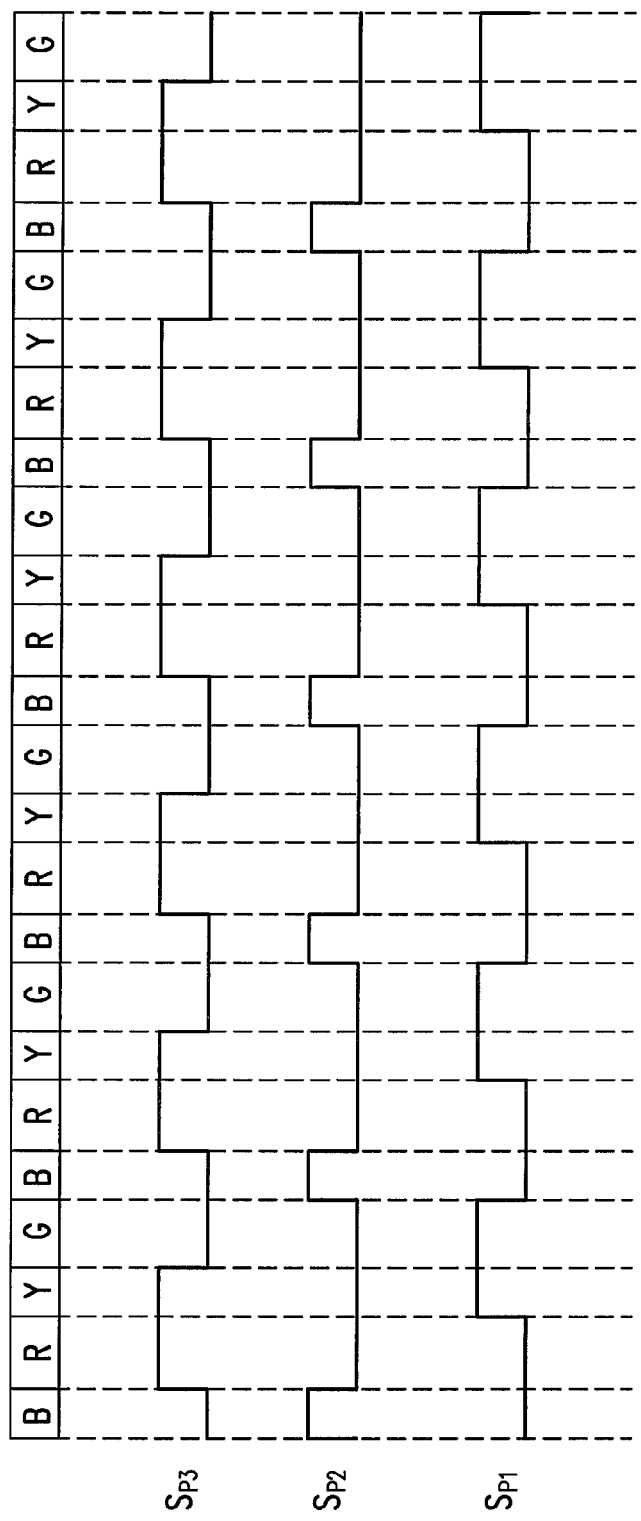
FIG. 11 is a timing diagram illustrating a first PWM signal, a second PWM signal, and a third PWM signal according to an embodiment of the invention.

In an embodiment of the invention, the first PWM signal $S_{P1}$ and the third PWM signals $S_{P3}$ are partially overlapped when the first and the third PWM signals $S_{P1}$ and $S_{P3}$ are at the high voltage level. Namely, the second light beam $P_2$ and the third light beam $P_3$ can be simultaneously generated when both the first PWM signal $S_{P1}$ and the second PWM signal $S_{P2}$ are at the high voltage level. Please refer to FIG. 11. FIG. 11 is a timing diagram illustrating the first PWM signal $S_{P1}$, the second PWM signal $S_{P2}$, and the third PWM signal $S_{P3}$ according to an embodiment of the invention. The first PWM signal $S_{P1}$ and the third PWM signal $S_{P3}$ are partially overlapped when the first PWM signal $S_{P1}$ and the third PWM signal $S_{P3}$ are at the high voltage level. Given the second light beam $P_2$ is green (G) and the fourth light beam $P_4$ is red (R) when the first PWM signal $S_{P1}$ and the third PWM signal $S_{P3}$ are at the high voltage level, the combined second and fourth light beams $P_2$ and $P_4$ together form a yellow (Y) light beam. Hence, four different color light beams can be generated by three light sources, and applications of the light source module 300 can then be diversified.

In light of the foregoing, the first light source as described in the above embodiments emits the light beam to the wavelength transforming unit periodically according to the PWM signal, so as to obtain color light different from the incident light beam. Here, the light beam irradiates a start position on the wavelength transforming unit, and the start position can be changed based on the actual condition of use, so as to extend the life time of the wavelength transforming unit. On the other hand, the wavelength transforming unit can transform the first light beam having the first wavelength into the second light beam having the second wavelength. Therefore, the light source with low light emitting efficiency can be replaced by the light source with favorable light emitting efficiency, and energy can be better utilized.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims.

What is claimed is:

1. A light source module comprising:
   a first light source for generating a first light beam having a first wavelength according to a first pulse width modulation signal;
   a wavelength transforming unit for transforming the first light beam into a second light beam having a second wavelength;
   a driver for driving the wavelength transforming unit, such that the first light beam irradiates a start position on the wavelength transforming unit when a rising edge of the first pulse width modulation signal is detected, wherein the start position is determined by a controller;
   a second light source for generating a third light beam having a third wavelength according to a second pulse width modulation signal; and
   a third light source for generating a fourth light beam having a fourth wavelength according to a third pulse width modulation signal.

2. The light source module as claimed in claim 1, wherein the driver has a motor for rotating the wavelength transforming unit, and when the wavelength transforming unit rotates and the first pulse width modulation signal is at a high voltage level, the first light beam irradiates an arc-shaped section of the wavelength transforming unit from the start position.

3. The light source module as claimed in claim 1, wherein the wavelength transforming unit has a substrate coated with a fluorescent layer, and after the fluorescent layer is irradiated by the first light beam, the second light beam having the second wavelength is generated.

4. The light source module as claimed in claim 1, wherein the first light source has at least one light emitting diode or at least one laser diode.

5. The light source module as claimed in claim 1, wherein the first pulse width modulation signal, the second pulse width modulation signal, and the third pulse width modulation signal are not overlapped with one another when the first, the second, and the third pulse width modulation signals are at the high voltage level.

6. The light source module as claimed in claim 1, wherein the first pulse width modulation signal and the third pulse width modulation signal are partially overlapped when the first and the third pulse width modulation signals are at the high voltage level.

7. A projection apparatus comprising:
   a lens for projecting images;
   a timing device for accumulating an using time of the projection apparatus;
   a controller for determining a start position on a wavelength transforming unit according to the using time; and a light source module comprising:
  a first light source for generating a first light beam having a first wavelength according to a first pulse width modulation signal;
  the wavelength transforming unit for transforming the first light beam into a second light beam having a second wavelength; and
  a driver for driving the wavelength transforming unit, such that the first light beam irradiates a start position on the wavelength transforming unit when a rising edge of the first pulse width modulation signal is detected.

8. The projection apparatus as claimed in claim 7, wherein when the using time reaches a multiple of a predetermined time period, the controller changes the start position on the wavelength transforming unit.

9. The projection apparatus as claimed in claim 7, wherein the driver has a motor for rotating the wavelength transforming unit, and when the wavelength transforming unit rotates and the first pulse width modulation signal is at a high voltage level, the first light beam irradiates an arc-shaped section of the wavelength transforming unit from the start position.

10. The projection apparatus as claimed in claim 7, wherein the wavelength transforming unit has a substrate coated with a fluorescent layer, and after the fluorescent layer is irradiated by the first light beam, the second light beam having the second wavelength is generated.

11. The projection apparatus as claimed in claim 7, wherein the first light source has at least one light emitting diode or at least one laser diode.

12. The projection apparatus as claimed in claim 7, wherein the light source module further comprises a second light source and a third light source, the second light source generates a third light beam having a third wavelength according to a second pulse width modulation signal, and the third light source generates a fourth light beam having a fourth wavelength according to a third pulse width modulation signal.

13. The projection apparatus as claimed in claim 12, wherein the first pulse width modulation signal, the second pulse width modulation signal, and the third pulse width modulation signal are not overlapped with one another when the first, the second, and the third pulse width modulation signals are at a high voltage level.

14. The projection apparatus as claimed in claim 12, wherein the first pulse width modulation signal and the third pulse width modulation signal are partially overlapped when the first and the third pulse width modulation signals are at a high voltage level.

15. A method of controlling a projection apparatus, comprising:
  providing a timing device for accumulating an using time of the projection apparatus;
  determining a start position on a wavelength transforming unit of the projection apparatus based on the using time;
  driving a first light source to generate a first light beam having a first wavelength according to a first pulse width modulation signal; and
  driving the wavelength transforming unit, such that the first light beam irradiates the start position when a rising edge of the first pulse width modulation signal is detected, wherein the wavelength transforming unit transforms the first light beam into a second light beam having a second wavelength.

16. The method as claimed in claim 15, further comprising:
  changing the start position on the wavelength transforming unit by a controller when the using time reaches a multiple of a predetermined time period.

17. The method as claimed in claim 15, further comprising:
  providing a motor for rotating the wavelength transforming unit,
  wherein when the wavelength transforming unit rotates and the first pulse width modulation signal is at a high voltage level, the first light beam irradiates an arc-shaped section of the wavelength transforming unit from the start position.

18. The method as claimed in claim 15, wherein the wavelength transforming unit has a substrate coated with a fluorescent layer, and after the fluorescent layer is irradiated by the first light beam, the second light beam having the second wavelength is generated.

19. The method as claimed in claim 15, wherein the first light source has at least one light emitting diode or at least one laser diode.

20. The method as claimed in claim 15, further comprising:
  driving a second light source to generate a third light beam having a third wavelength according to a second pulse width modulation signal; and
  driving a third light source to generate a fourth light beam having a fourth wavelength according to a third pulse width modulation signal.

21. The method as claimed in claim 20, wherein the first pulse width modulation signal, the second pulse width modulation signal, and the third pulse width modulation signal are not overlapped with one another when the first, the second, and the third pulse width modulation signals are at a high voltage level.

22. The method as claimed in claim 20, wherein the first pulse width modulation signal and the third pulse width modulation signal are partially overlapped when the first and the third pulse width modulation signals are at a high voltage level.

* * * * *